3,300,845
ARTICLE ASSEMBLING APPARATUS

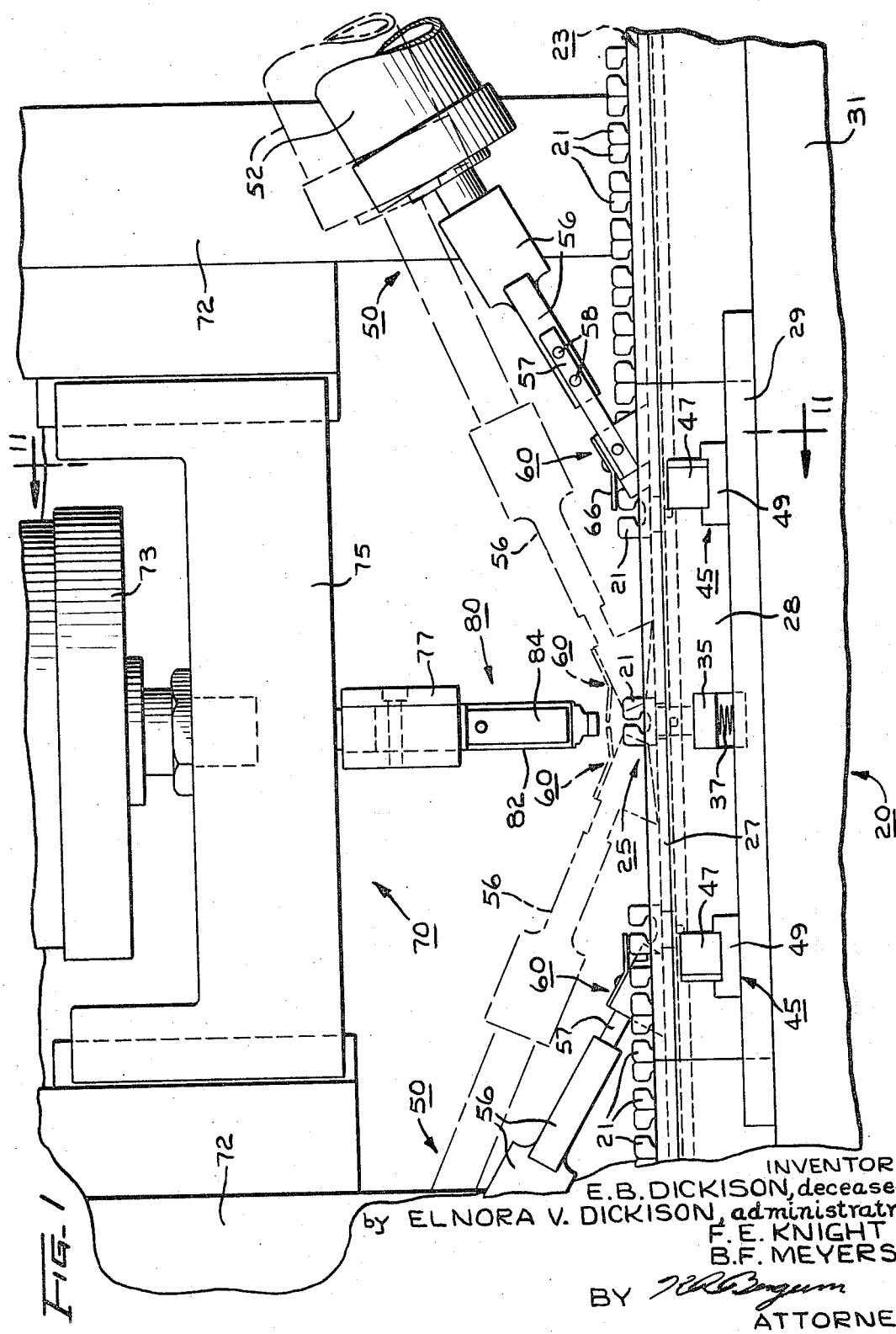

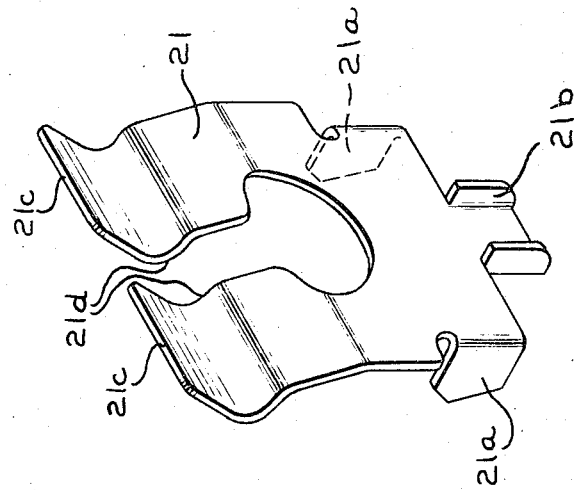
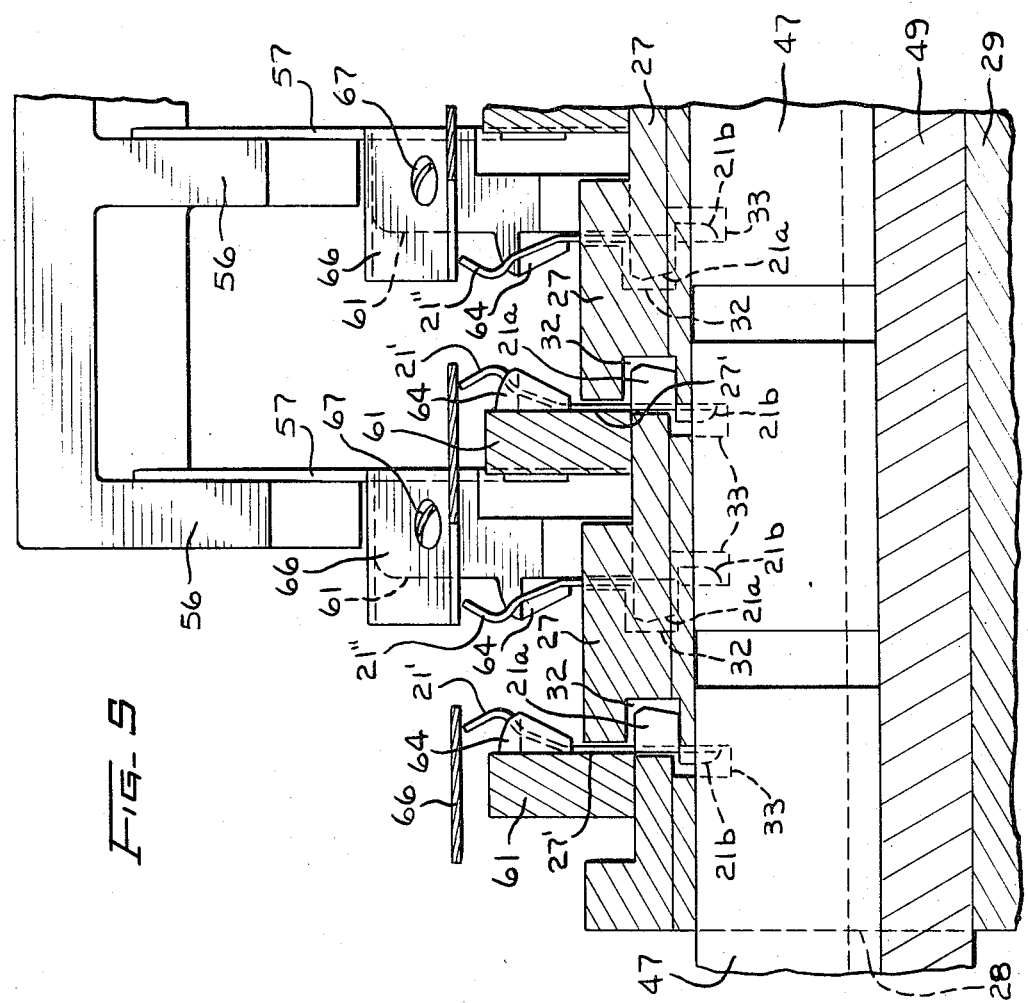

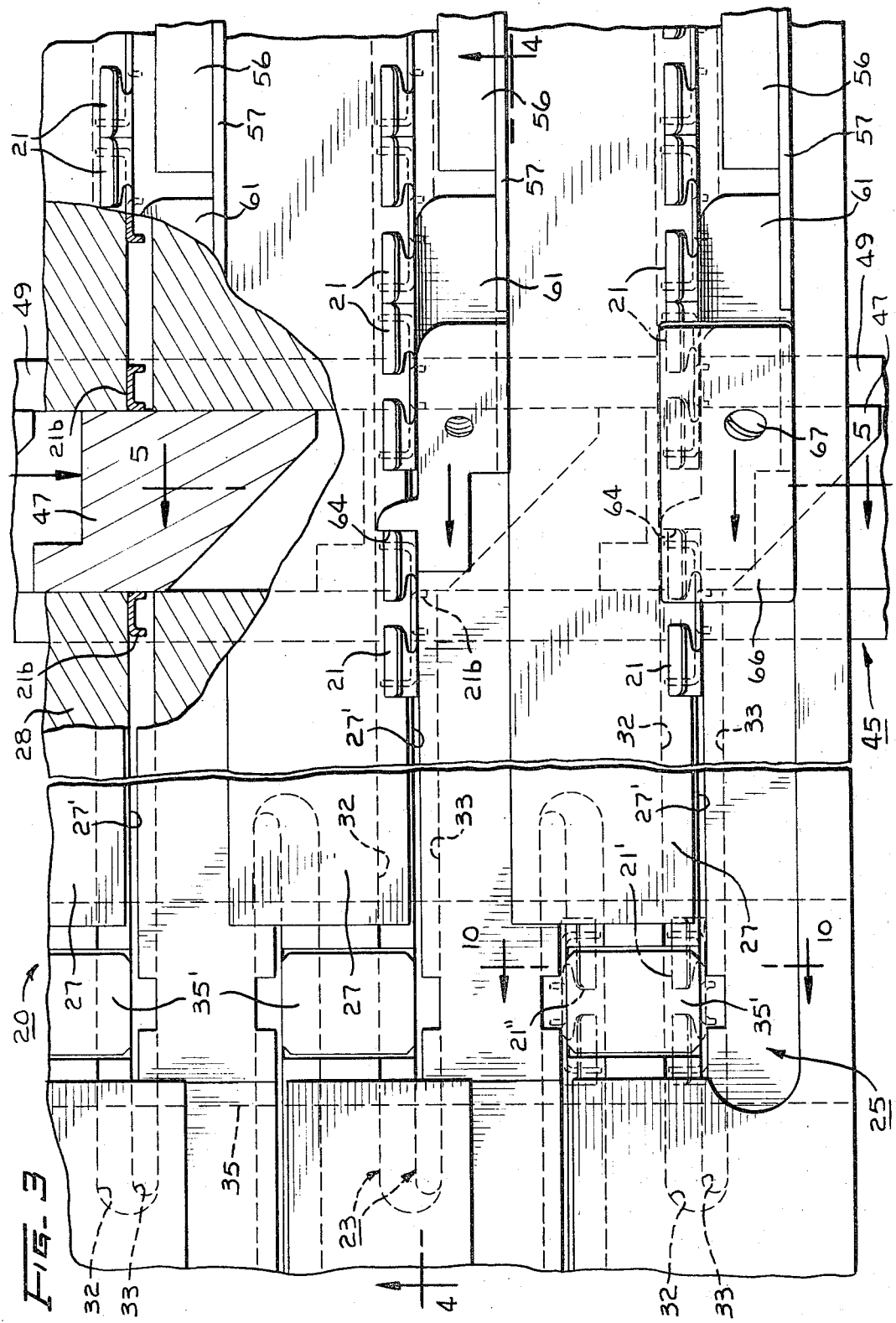

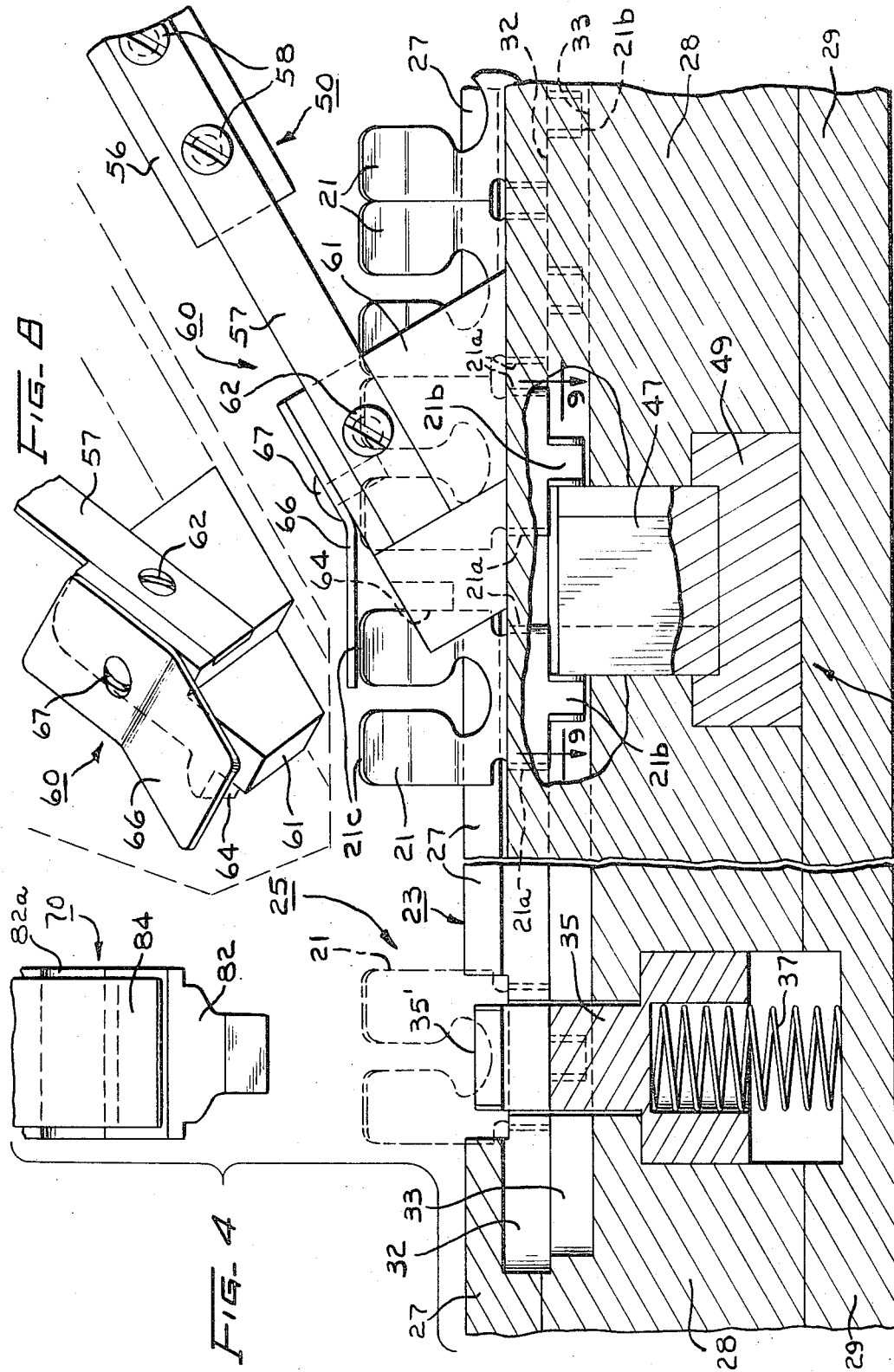

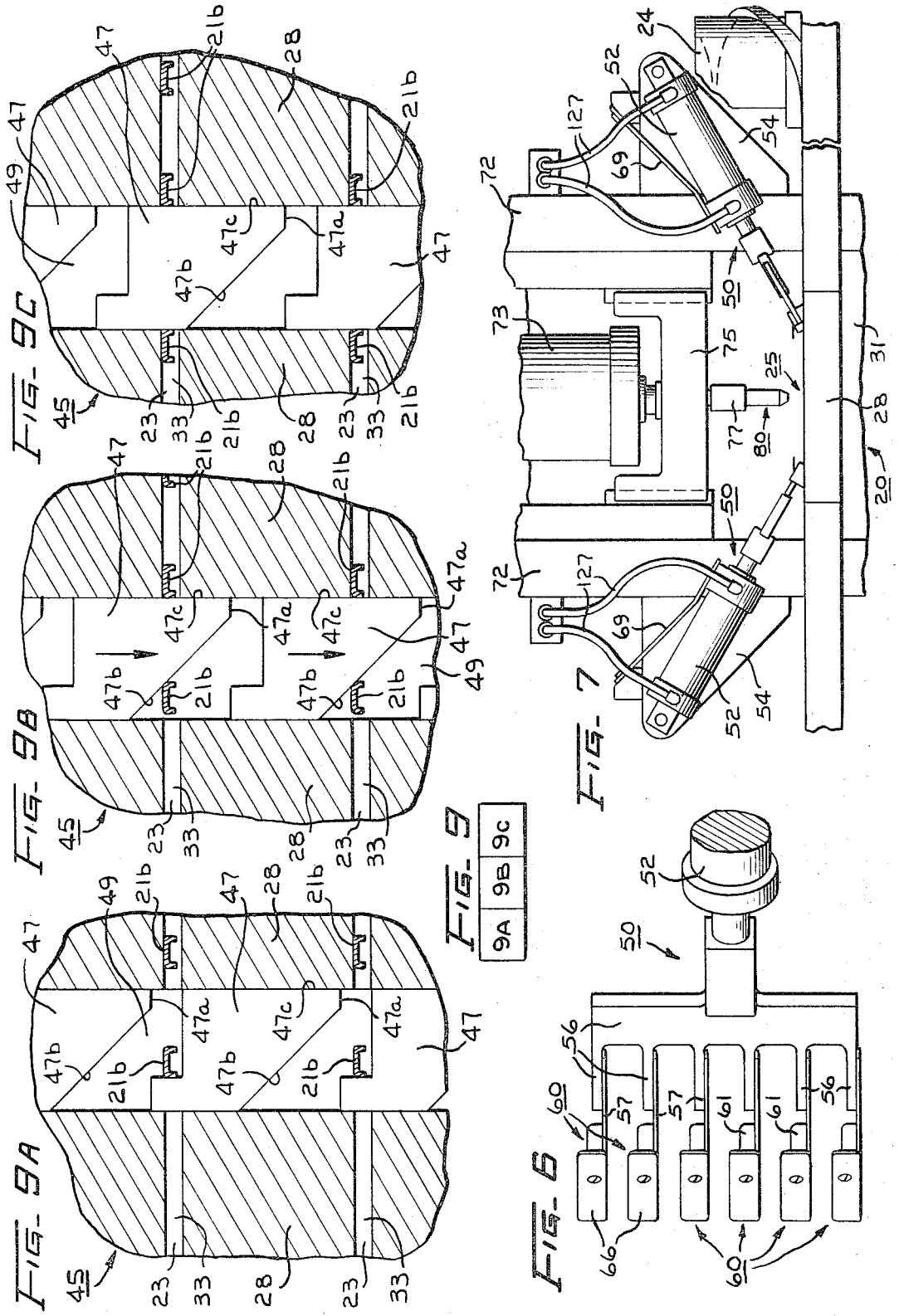

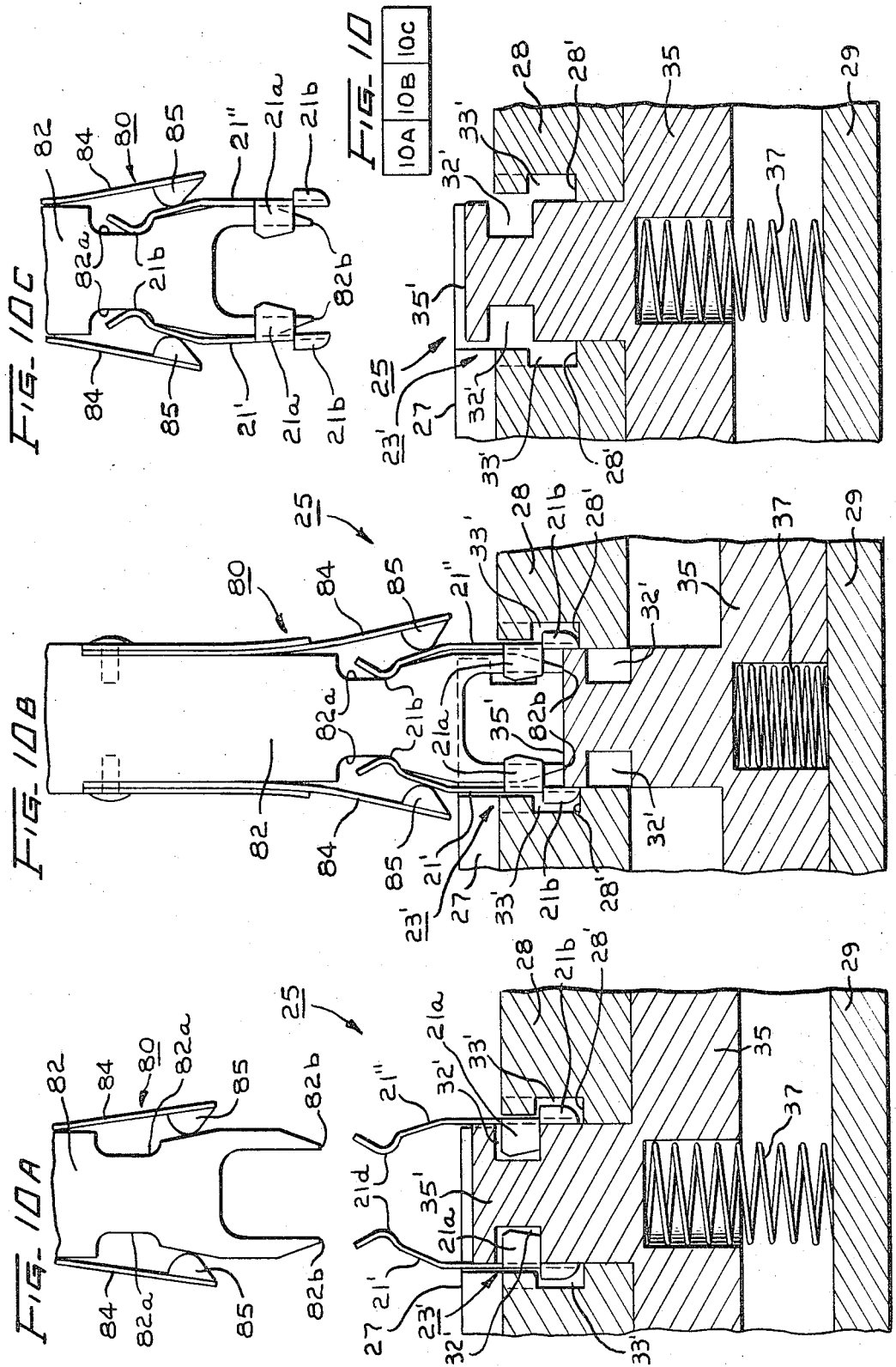

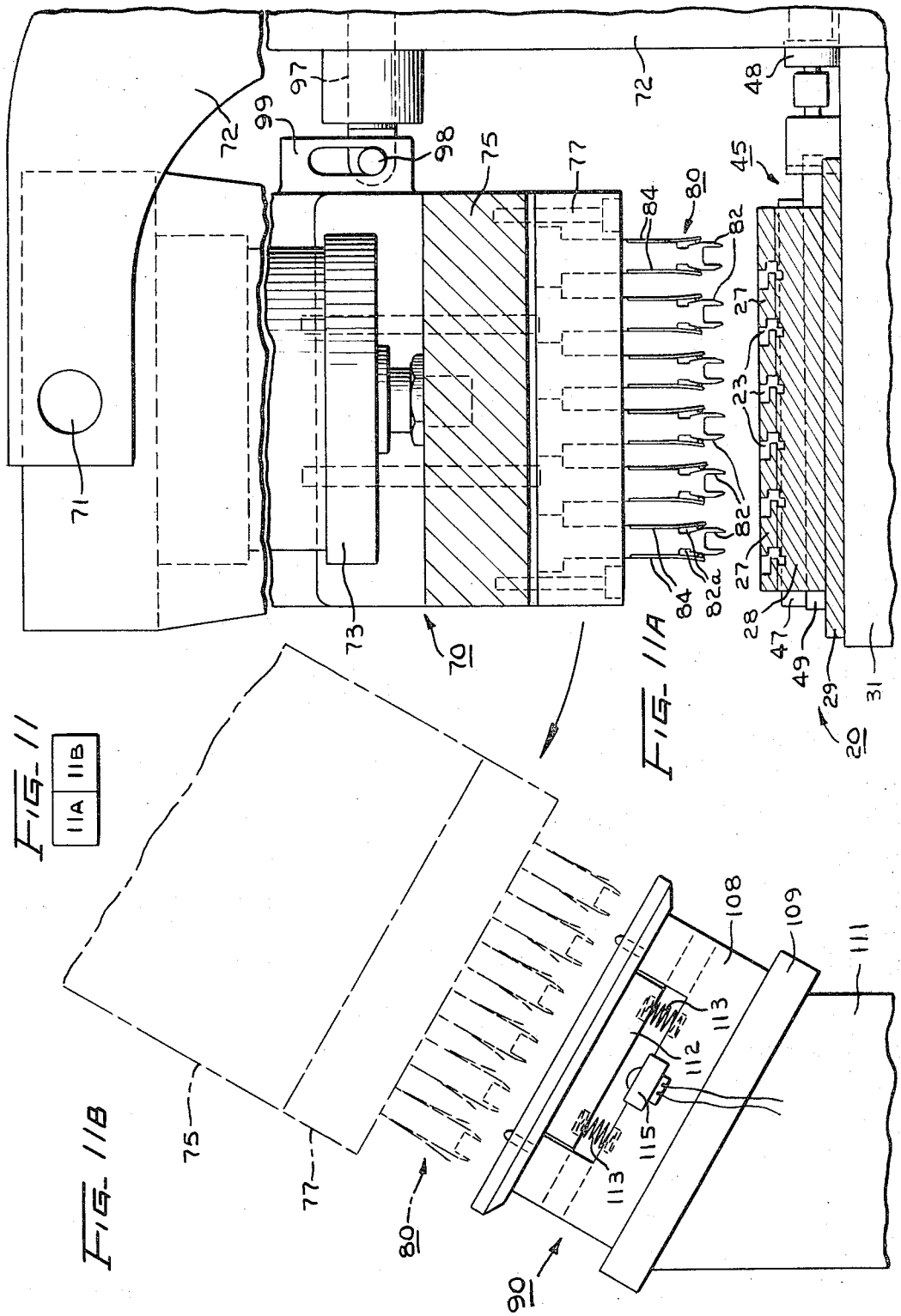

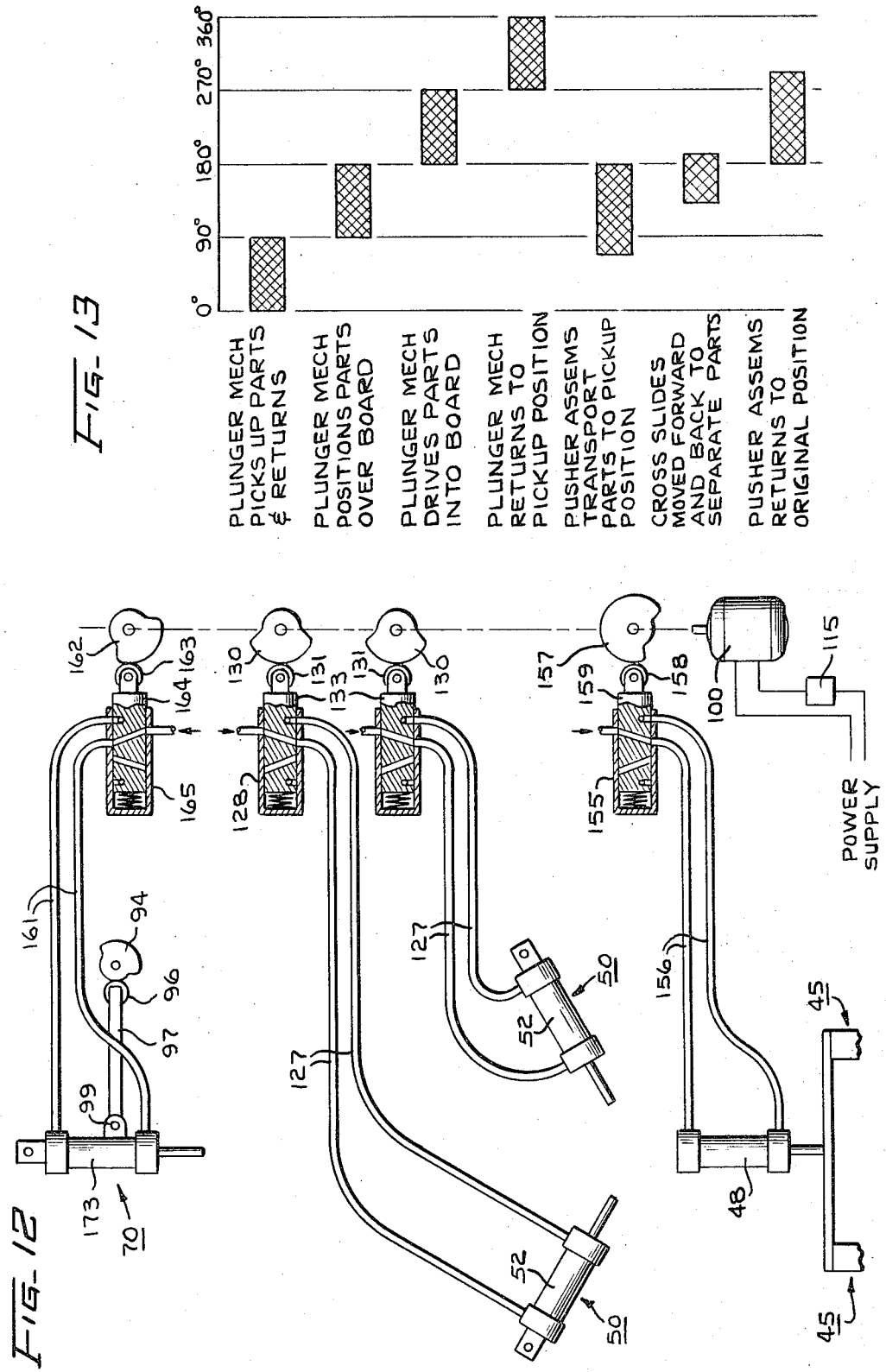

Francis E. Knight, Greenwood, and Benjamin F. Meyers, Indianapolis, and Earl B. Dickison, deceased, late of Indianapolis, Ind., by Elnora V. Dickison, administratrix, Indianapolis, Ind., assignors to Western Electric Company, Incorporated, New York, N.Y., a corporation of New York.
Filed Feb. 19, 1965, Ser. No. 434,141
15 Claims. (Cl. 29—206)

This invention relates to article assembling apparatus and, more particularly, to apparatus for handling a plurality of piece parts, such as terminals, in pairs, and positioning them in precise, spaced relation and orientation in or on an associated mounting member.

It is a general object of this invention to manipulate a plurality of small piece parts in a prescribed manner and with precision utilizing automated apparatus of unique construction.

It is often desirous in the manufacture of apparatus which includes a large number of small piece parts, and especially those of complex shape, to automate the assembly thereof whenever high volume production is involved. The need for automated assembling apparatus is particularly important, and often essential, when minute piece parts must be initially positioned into desired groupings, picked up, oriented, transported to and placed into slots, apertures or receptacles of a mounting member. Precision handling is also of particular importance when the piece parts are fragile and/or yieldable.

Concomitantly, in mass production applications, automated assembling apparatus is often dictated because of cost factors and/or the inherent lack of adequate dexterity on the part of even the most skilled operators in manipulating certain piece parts efficiently and reliably.

A need recently arose for an article assembling apparatus, and the design of such apparatus became of paramount importance, in fabricating a sub-assembly employed in one version of a new push-button telephone. More specifically, a number of the aforementioned problems arose in attempting to assemble small, intricately shaped terminals, in pairs, within preformed holes extending through a terminal mounting board.

Accordingly, a more specific object of this invention is to position, grasp, and pick up a plurality of terminals, in pairs, at a transfer station and thereafter orient, transfer to and place the terminals in an associated mounted board at an assembly station, while continuously maintaining the terminals in precise alignment and spaced relationship with automated assembling apparatus of novel and improved construction.

It is still a further object of this invention to facilitate the assembling of small, complex piece parts, such as terminals, with a unique combination of piece part feeding, separating, positioning, withdrawing-inserting and transporting mechanisms of unique and simplified construction.

In accordance with a preferred embodiment of the invention, a succession of terminals are fed by gravitation and vibration in piggy-back fashion along each of a plurality of guide tracks. The tracks are arranged into two groups, with the tracks in one group extending toward and being respectively offset from the tracks in the other group. A terminal transfer station, including a platform partly defining a plurality of guide track extensions, is interposed between the two groups of tracks. The track extensions are respectively aligned with the tracks of the two groups, so as to effect the interleaving of the latter.

In accordance with aspects of the invention, the front or end terminal in each track of each group is separated from the others by a reciprocally operated cross-slide mechanism and, thereafter, two reciprocably operated pusher assemblies, each associated with a different group of tracks, contact the separated terminals in the associated groups and simultaneously drive them to a desired point along the associated track extensions. In one specific application, the terminals from the two groups are interleaved and aligned along a common lateral line perpendicular to the track extensions. As such, a terminal from one group in one track extension and a terminal from the other group in an immediately adjacent track extension form a particular one of a plurality of pairs of terminals to be subsequently mounted in a terminal board.

In accordance with another aspect of the invention, a reciprocally operated plunger mechanism mounted immediately above the transfer platform of interleaved tracks, contains a plurality of spring-biased fingers which simultaneously, in sequence, respectively grasp, pick up and transfer the plurality of previously positioned pairs of terminals to an assembly station, and thereafter insert them into preformed openings in the terminal board. During the grasping and transferring portions of the operating cycle, the respective pairs of terminals are continuously maintained in their original, proper relative position and orientation.

In accordance with still another aspect of this invention, the transfer platform is spring mounted so as to be depressible relative to the terminals supported on a stationary member associated therewith. This facilitates rapid and reliable gripping of the terminals by the spring-biased fingers associated with the plunger mechanism. More specifically, when the spring-biased fingers descend to grasp the aligned pairs of terminals in the track extensions, the depressible platform allows each finger of the plunger assembly to extend downwardly between the two terminals of each associated pair to a depth sufficient to insure reliable grasping of the terminals over a substantially larger cross-sectional area than would otherwise be possible. After the plunger has raised the respective pairs of terminals from the depressible platform, the latter rises to again provide complete and continuous track extensions for guiding the next plurality of separated terminals into the desired aligned array under the plunger assembly.

The assembling apparatus as thus described is seen to be constructed to manipulate small piece parts rapidly and reliably in a prescribed manner so as to facilitate their insertion into associated apparatus on a completely automated basis.

The foregoing and other objects, features and advantages of this invention will become more fully understood from a consideration of the following description and related accompanying drawings, in which:

FIG. 1 is a side elevational view, partly in cross section, illustrating one preferred embodiment of the invention;

FIG. 2 is a perspective view of a piece part comprising a terminal which is manipulated an assembled in a mounting board with the apparatus depicted in FIG 1;

FIG. 3 is an enlarged, fragmentary plan view, partially in section, of several guide tracks, terminal separating, feeding and transferring mechanisms of the apparatus of FIG. 1;

FIG. 4 is an enlarged, sectional view taken along the line 4—4 of FIG. 3, and partciularly illustrates features of the spring-mounted transfer platform, the cross-slide terminal separator mechanism, and one of the two reciprocally operated pusher assemblies for simultaneously pushing the separted terminals in the associated groups of guide tracks to a desired position on the transfer platform in accordance with the principles of the invention;

FIG. 5 is an enlarged, fragmentary view, mainly in section, taken along the line 5—5 of FIG. 3, and illustrates the position and orientation of the terminals relative to the associated guide tracks, and also depicts portions of the two reciprocally operated pusher assemblies;

FIG. 6 is an enlarged, fragmentary plan view of the six-pronged pusher foot holder, of the pusher assembly, which holder simultaneously makes contact with and subsequently drives the six separated terminals in the six respectively associated guide tracks to the tranfer platform;

FIG. 7 is a simplified, front elevational view of the two mutually opposed pusher assemblies, including the air-operated, double-acting cylinders associated therewith and the manner in which the assemblies are pivotally mounted on the frame of the apparatus;

FIG. 8 is a detail, fragmentary perspective view, of one pusher foot as embodied in the invention;

FIG. 9 is comprised of a series of three enlarged, fragmentary detail views, FIG. 9A, FIG. 9B, and FIG. 9C, in section, taken along the line 9—9 in FIG. 4, and illustrates features of one of the two cross-slide terminal separating mechanisms associated with the guide tracks as embodied in the invention;

FIG. 10 is comprised of a series of three enlarged, fragmentary detail views, FIG. 10A, FIG.10B, and FIG. 10C, in section, taken along the line 10—10 in FIG. 3, and illustrates the position of one of the six spring-biased fingers associated with the common plunger mechanism relative to a pair of spaced terminals positioned in adjacent relationship on the spring-biased platform at different periods of the operating cycle of the apparatus;

FIG. 11 is comprised of two views, FIG. 11A, partially in section, taken along the line 11—11 in FIG. 1, illustrates features of the reciprocally operated plunger mechanism in a normal position relative to the transfer platform, and FIG. 11B, in phantom, illustrates the position of the plunger mechanism relative to a mounting member at a terminal assembling station;

FIG. 12 is a schematic diagram illustrating the air-operated cylinders and associated valves which sequentially operate under the control of cams during the complete operating cycle of the apparatus in accordance with the principles of this invention; and FIG. 13 is a timing chart illustrating the various time periods during which the major moving parts are operated during a complete operating cycle of the apparatus as embodied in the invention.

Considering the drawings now in greater detail, FIG. 1 best depicts the overall view of the assembling apparatus designated generally by the reference numeral 20. The apparatus is particularly constructed to feed small, complex shaped piece parts, such as terminals 21 (depicted in FIG. 2) along a plurality of guide tracks 23 (best seen in FIGS. 3, 5, 8 and 9) to a work transfer station designated generally by the reference numeral 25 (best seen in FIGS. 1, 3 and 10). The terminals are supplied to the respective guide tracks from one of two conventional vibratory feeder bowls 24 (only one shown in FIG. 7), positioned above and adjacent the outer ends of the associated group of tracks on either side of the transfer station. The terminals are fed along the tracks in piggy-back fashion in response to the combination of gravity feed from and vibration set up by the associated supply bowl.

A two-part base comprised of members 27 and 28 (best seen in FIGS. 1, 4 and 5), forms six parallel extending guide tracks 23 on either side of the transfer station 25. As depicted in FIG. 5, member 27 is formed of two parallel extending segments separated by a terminal slot 27' disposed intermediate the ends thereof. The guide track forming members are in turn mounted on a sub-base 29 in the region of the transfer station, with a rigid frame member 31 supporting both the sub-base and the guide track member 28. As best seen in FIG. 5, the guide tracks 23 each comprises an upper longitudinally extending passage 32 to accommodate a pair of protruding tabs 21a of the terminal 21 (depicted in FIG. 2), and a lower longitudinally extending passage 33 to accommodate a pair of shorter, protruding tabs 21b; tabs 21a and 21b being bent in opposite directions. The guide tracks 23 to one side of the centrally located transfer station 25, forming one group, are respectively offset relative to those forming a second group on the opposite side of the transfer station.

In accordance with one aspect of the invention, the transfer station 25, as best seen in FIG. 10, includes a vertically depressible platform 35 mounted on a plurality of coil springs 37 (only one of which is shown in the drawing) and the stationary member 28. Platform 35, together with member 28, forms a plurality of guide track extensions 23' mounted on the sub-base 29. These track extensions, like the stationary guide tracks, are comprised of upper passages 32' and lower passages 33'.

The guide track extensions 23' are thus seen to effect the interleaving of the stationary guide tracks 23 of the two groups in the region of the transfer station. As such, the terminals 21 may be aligned laterally across the spring-mounted platform i.e., perpendicular to the track extensions, to form adjacent pairs. As depicted in FIG. 10, terminals designated 21' and 21" form one of six such pairs of terminals to be subsequently transferred to and inserted in a mounting member 90 (FIG. 11B). Member 90 may comprise, for example, a terminal mounting board with preformed apertures therein to accommodate the lower terminal tabs 21b. The importance of having the platform 35 spring-mounted for vertical movement relative to the stationary guide tracks will become more apparent in connection with a discussion of the manner in which the terminals are grasped, picked up, transported to and inserted in the mounting board.

As the terminals are fed along the guide tracks 23 in piggy-back fashion, as best seen in FIGS. 1 and 4, it becomes very important that the front or end terminal in each guide track be reliably and rapidly separated from the others in the respectively associated tracks so as to allow a suitable member to contact and positively drive only the separated terminals to the transfer station for subsequent manipulation and assembly.

In accordance with another aspect of the invention, a pair of cross-slide mechanisms generally designated by the reference numeral 45 (best seen as a pair in FIG. 1, and in detail in FIGS. 3, 4 and 9), are respectively positioned on opposite sides of the transfer station 25 to effect the desired terminal separation. Inasmuch as the cross-slide mechanisms 45 are identical in construction and in mode of operation, reference will generally be made to only one of them hereinafter. As depicted in the fragmentary detail view of FIG. 9, the cross-slide mechanism 45 comprises a plurality of upwardly extending, laterally disposed beveled members 47 respectively associated with the guide tracks 23, and rigidly mounted on a common, slidable, lower supporting sub-base 49 (best seen in FIGS. 1, 4 and 5). Members 47 and 49 could, of course, be constructed as one member if desired. The movable members 47 and 49 are in turn mounted on the intermediate base 29 affixed to the frame 31. As depicted in FIGS. 11A and 12, the two movable cross-slide mechanisms 45 are connected together (as shown symbolically in FIG. 12) for simultaneous, reciprocal movement effected by a double-acting air cylinder designated generally by the reference numeral 48.

The air-operated timing sequence for the cross-slide mechanisms will be described in greater detail hereinafter. With specific reference to FIG. 9, each upwardly extending beveled cross-slide member 47 of each mechanism has a narrow nest portion 47a which, upon being moved from the position shown in FIG. 9A to the position shown in FIG. 9B, passes between the lowermost tabs 21b of two adjacent terminals 21 in an associated guide track 23.

The beveled side 47b of each cross-slide member 47 thus acts as a wedge to nudge the end or front terminal 21 in the associated guide track 23 to the left and away from the terminal previously positioned immediately adjacent thereto. The flat surface 47c prevents any movement of the next-to-front terminal in the series during the terminal separating portion of the operating cycle.

The beveled members 47 in continuing to move perpendicularly with respect to the stationary guide tracks 23 finally arrive at the position shown in FIG. 9C whereat the trailing edge of the lower, rearward tab 21b of the end terminal in each track is separated from the leading edge of the lower, forward tab 21b of the nearest (previously adjacent) terminal by the thickness of the crossslide member 47, as measured axially of the guide track. The maximum separation effected by one of the crossslide mechanisms 45 is best illustrated in FIG. 4. At this point, the beveled members 47 are in the position depicted in FIG. 9C. Thereafter, the cross-slide mechanism 45 is retracted such that members 47 return to the position shown in FIG. 9A, to commence the separation of the next succeeding group of end terminals positioned in the guide tracks 23 respectively associated therewith.

Upon the end terminals in the guide tracks of the two groups being separated, a pair of reciprocally operated, pneumatically driven pusher assemblies 50 (best seen in FIGS. 1 and 7), simultaneously make contact with and positively drive the six separated terminals in the respectively associated groups to a desired point on the transfer platform 35. As the two groups of tracks become interleaved on the platform, the pusher assemblies 50 ultimately position the twelve separated terminals into six adjacent pairs aligned perpendicularly relative to the track extensions 23a. One of such pairs is depicted at the transfer station in FIG. 10.

As best seen in FIGS. 1, 4, 7 and 8, the two plunger assemblies are mutually opposed and oppositely inclined on either side of the transfer station 25. The two plunger assemblies are identical in construction and operation, and, therefore, detailed reference will be made hereinafter to only one of them. Each plunger assembly 50 includes a double-acting air cylinder 52 of conventional design, pivotally mounted at its upper end to a bracket 54 (FIG. 9). Air is supplied to sequentially operate the cylinder through an air control circuit described in greater detail hereinafter in connection with FIG. 12. As shown in detail in FIG. 6, a six-pronged or forked pusher holder 56 is attached to the piston of the air cylinder 52, with the terminating ends of the prongs each supporting a bracket 57 affixed thereto by fasteners 58. The lower end of each of the brackets 57 in turn supports a pusher foot designated generally by the reference numeral 60 (best seen in FIG. 8). Each pusher foot includes a member 61 attached by a fastener 62 to the bracket 57. The pusher foot member 61 has a protruding tab 64 (FIGS. 3, 5 and 8) extending outwardly of one vertically extended edge thereof to engage an associated one of the separated terminals 21. A resiliently mounted biasing member 66 is affixed to the pusher foot member 61 by means of a fastener 67 and extends forwardly along a horizontal plane a distance sufficient to contact and press downwardly upon a section of the upper edge 21c of a separated terminal 21. The lower portion of each pusher foot member 61 is guided in the open groove defined by two adjacent and associated guide track members 27 (FIG. 5).

With terminal contact made at two points by each pusher foot 60, namely, by a forward facing edge of the tab 64 integrally formed on the main pusher foot member 61, and by the downwardly exerted pressure effected by the resilient member 66, each separated terminal is firmly contacted and positively driven to the desired point at the work transfer station 25 under the control of the reciprocally operated air cylinder 52. It is, of course, understood that both pusher assemblies operate in unison, and thereby together positively drive twelve terminals in interleaved relationship to the desired point at the transfer station, with the pusher assemblies then being fully extended as shown in phantom in FIG. 1. To insure that the pusher feet firmly bias the separated terminals downwardly against the respectively associated guide tracks while being driven to the work transfer station, a resilient leaf-spring 69 (FIG. 7), affixed at one end to the frame member 54, exerts a downwardly directed force on the air cylinder of the associated pusher assembly.

As embodied herein in accordance with another aspect of the invention, the terminals 21 are initially grasped, removed from the platform 35, and transported in precise orientation and spaced relationship to the assembly station by means of a plunger mechanism designated generally by the reference numeral 70 (best seen in FIGS. 1 and 11A).

Plunger mechanism 70 is pivotally attached at its upper end by an arbor 71 to a supporting frame member 72. Mechanism 70 includes a reciprocally operated doubleacting air cylinder 73 (only partially shown in FIG. 1) which drives a lower housing 75 within which is mounted for vertical, reciprocal movement, a finger supporting nose portion 77. As best seen in FIGS. 10 and 11, the slidable nose portion 77 is adapted to support a plurality of spaced, bifurcated, spring-biased pickup fingers designated generally by the reference numeral 80. Each finger comprises a bifurcated central member 82 and a pair of resilient springs 84 respectively attached at one end to a different one of the upper edges of the bifurcated member 82. Each of the springs 84 has a nose portion 85 (best seen in FIG. 10) extending inwardly toward and biased against the adjacent lower edge of the bifurcated member 82.

As depicted in the three-part sequence of FIG. 10, downwardly extending points 82b of the bifurcated member 82 initially make contact with the inner surfaces 21d of the respective, mutually opposed pairs of terminals 21. This causes each pair of terminals to initially spread outwardly, following the contoured edges of the associated member 82. Further penetration of members 82 between the adjacent pairs of terminals finally results in the nose portions 85 of the springs 84 biasing the associated terminals toward each other until the curved portions 21d thereof snap into the notches 82a of the bifurcated members, as depicted in FIG. 10B. Continued downward movement of the spring-biased fingers 80 results in the ends 82d of the bifurcated members contacting the upper planar surface 35' of the spring-biased platform, and thereafter forcing the latter to move downwardly relative to the stationary member 28 and the terminals held thereby so as to depress the springs 37 until the bottom surface of the platforms abuts against the sub-base 29.

During this latter movement of the platform relative to the stationary member 28, the finger-held terminals remain stationary since the lower, outwardly extending edges of the tabs 21b thereof abut against a mating surface 28' of member 28.

It thus becomes apparent that it is the movement of the platform 35 relative to member 28 which allows the bifurcated members 82 of the fingers 80 to travel downwardly between the rigidly held pairs of terminals to a point whereat the mutually opposed curved surfaces 21d of the terminals snap into notches 82a of the members 82 to provide a locking action. This action, of course, also allows each finger 80 to grasp more reliably and positively the associated pair of terminals over a substantially larger cross-sectional area than would otherwise be possible. Thereafter, as depicted in FIG. 10C, the air cylinder 73 is operated to raise the spring-biased fingers 80 of the plunger mechanism with the six pairs of terminals held therein away from the platform 35 in preparation for the subsequent transfer of the terminals to the assembly station.

As best seen in FIG. 11A, the entire plunger mechanism 70 is caused to pivot sequentially about arbor 71 under the control of a cam 94 (shown symbolically in FIG. 12). The cam 94 drives a cam follower 96 associated with a linkage arm 97 and a connecting pin 98 slidably inserted into a slot of a bracket 99 affixed to the plunger mechanism housing 75.

After the plunger mechanism has been pivoted to the position depicted in FIG. 11B, the air cylinder 73 is operated to lower the fingers 80 so as to drive the lower tab portions 21b of the six pairs of terminals (not shown) into preformed and aligned apertures in the mounting board 90.

As also seen in FIG. 11B, the terminal board is mounted on a main base comprised of members 108, 109 and 111. A sub-base 112 mounted on springs 113 is also provided, with a microswitch 115 positioned therebelow and mounted on member 108. The spring-biased sub-base and microswitch provide a means for detecting whether a terminal board is present to receive the terminals transported thereto by the plunger mechanism 70. If a board is not positioned on the stationary base, the plunger mechanism causes the terminals held in the fingers thereof to drive the sub-base 112 down against the microswitch to effect the opening of the power supply line to the driving source 100 as depicted in FIG. 12. In the absence of this safety feature, the plunger mechanism could become jammed if the fingers thereof were lowered to pick up six new pairs of terminals at the transfer station while still holding six pairs of terminals previously picked up.

FIG. 12 schematically illustrates the operating inter-relationships between the various double-acting air cylinders, associated valves and cams which are operated under the control of the driving source 100. Considered more specifically, and utilizing corresponding reference numerals wherever appropriate, it is seen that in its simplist form, the apparatus employs the two air-operated, double-acting cylinders 52 to reciprocate the two plunger assemblies 50 respectively associated therewith, the single air-operated cylinder 48 to operate simultaneously the two common cross-slide mechanisms 45, and the air-operated cylinder 73 to operate the plunger mechanism 70.

Air cylinders 52 are operated simultaneously and reciprocally by air being supplied from a source (not shown) through a pair of conventional, reversible, air supply valves 125, and two pairs of air lines 127, respectively. The direction of air flow through each cylinder 52 is sequentially controlled by a cam 130 which drives a cam follower 131, the latter being connected to a port reversing piston 133 of the associated supply valve 125. Cams 130, as indicated by the dashed line 135 are driven by the power source 100 which may comprise any type of conventional constant speed motor.

The air cylinder 48 common to the two cross-slide mechanisms 45 is reciprocally operated in response to air being supplied thereto through a reversible air supply valve 155 and a pair of air lines 156. The direction of air flow through the cylinder 48 is sequentially controlled by a cam 157 driving a cam follower 158 which is connected to port reversing piston 159 of the air supply valve 155.

Similarly, the air cylinder 73 of the plunger assembly 70 is reciprocally operated in response to air being supplied thereto through a pair of air lines 161 under the sequential control of a cam 162 driving a cam follower 163 which is connected to a port reversing piston 164 of a reversible air supply valve 165.

FIG. 13 represents a timing chart which indicates the periods, in terms of degrees of cam rotation, during which the pusher assemblies 50, cross-slide mechanisms 45 and plunger mechanism 70 operate during a complete cycle.

With particular reference now to FIGS. 1, 12 and 13, a complete operating cycle will now be described. Starting with six pairs of terminals positioned at the transfer station 25, the plunger mechanism 70 is operated in the first period (0–90°) to lower the spring-biased finger assembly 80 to a position whereat the fingers reliably grasp the six pairs of terminals in the manner depicted in FIG. 10B. Immediately thereafter, the fingers 80 are retracted to withdraw the grasped terminals from the platform 35 at the transfer station and accurately hold them in spaced relationship in preparation for transfer to the assembly station.

Just before this portion of the operating cycle is completed, the two pusher assemblies 50 are operated to make contact with and thereafter drive the previously separated terminals 21 respectively associated therewith to an aligned position at the transfer station 25.

During the initial portion of this last-mentioned operation function, and starting the second period (90°–180°) of the operating cycle, the plunger mechanism 70 with the six pairs of terminals held thereby is pivoted to and positioned immediately above the terminal mounting board 90 at the assembly station.

Commencing at about the middle of this second period, at which point the pusher assemblies 50 are nearly fully extended (as shown in phantom in FIG. 1), the two cross-slide mechanisms 45 are operated to separate the six end terminals then in the guide tracks respectively associated therewith for subsequent transporting to the transfer station.

After the puser assemblies 50 have been fully extended, the plunger mechanism 70 positioned immediately above the terminal board 90 at the assembly station, and the two cross-slide mechanisms 45 moved to a position whereby they respectively separate two new sets of terminals, the third period commences (180°–270°), with the fingers 80 of the plunger mechanism being operated to move downwardly so as to drive the six pairs of terminals held thereby into preformed apertures in the terminal board. During this same period of the operating cycle, the pusher assemblies 50 are retracted to their initial position. Also during the initial portion of the third period, immediately after the pusher assemblies 50 start to retract, the two cross-slide mechanisms are rapidly retracted to their original position.

Just as the pusher assemblies 50 are fully retracted, the fourth period (270°–360°) starts with the plunger assembly being pivotally returned from the assembly station (shown in phantom in FIG. 11B) to a position whereat the fingers thereof are again positioned immediately above the platform 35 preparatory to the commencement of the next succeeding operating cycle.

It is to be understood that the specific embodiment described herein is merely illustrative of the general principles of the present invention. Various other arrangements and modifications may be devised in the light of this disclosure by one skilled in the art without departing from the spirit and scope of this invention.

What is claimed is:
1. Apparauts for assembling piece parts comprising:
a plurality of stationary guide tracks extending in juxtaposed relationship and terminating in lateral alignment;
means for feeding piece parts in piggy-back relationship along each of said guide tracks;
a transfer station positioned adjacent the common terminating ends of said stationary guide tracks, said transfer station including a spring-mounted platform and an associated stationary member which together form a plurality of guide track extensions respectively aligned with said stationary guide tracks;
means positioned near the ends of said stationary guide tracks nearest said transfer station for separating the end piece part in each stationary guide track from the piece part normally positioned immediately adjacent thereto;
reciprocally operated means for simultaneously driving the separated piece parts to a desired point along the respectively aligned guide track extensions; and
reciprocally operated pick-up means for grasping and withdrawing the separated piece parts from said guide track extensions, and thereafter holding said piece parts in precise orientation and spaced relationship while transporting them to and inserting them in a mounting member at an assembly station.

2. Apparatus in accordance with claim 1, wherein a second plurality of guide tracks are positioned on the side of said transfer station opposite the first-mentioned plurality of guide tracks, with the guide tracks on each side of the transfer station forming a different group, and the two groups being offset with respect to each other, and wherein said spring-mounted platform and associate member together also form a second plurality of guide track extensions respectively aligned with the stationary guide tracks forming the second group.

3. Apparatus in accordance with claim 1, wherein said reciprocally operated pick-up means comprises a plurailty of spring-biased fingers constructed to grasp firmly the separated piece parts on the guide track extensions respectively aligned therewith, and further comprising means for pivotally mounting and effecting the sequential pivoting of said pick-up means so as to permit the transfer of the piece parts held thereby to the assembly station.

4. Apparatus in accordance with claim 2, wherein said sequentially operated means for separating the end piece part in each guide track of each group comprises two reciprocally operated cross-slide mechanisms respectively associated with each group, each cross-slide mechanism including means to wedge the end piece part in each guide track of the associated group away from the piece part previously adjacent thereto while temporarily holding the latter piece part stationary.

5. Apparatus in accordance with claim 2, wherein said reciprocally operated means for simultaneously driving the separated piece parts to a desired point along the guide track extensions comprises two pneumatically driven, mutually opposed, and oppositely inclined pusher assemblies respectively associated with the two groups of guide tracks.

6. Apparatus for assembling piece parts comprising:
a plurality of guide tracks extending toward each other from opposite directions to form two groups, with the common, mutually adjacent terminating guide track ends of the two groups being spaced apart;
means for feeding piece parts in piggy-back fashion along each of said guide tracks;
transfer station means interposed between said two groups of guide tracks, said transfer station means including a spring mounted platform and an associated stationary member which together form a plurality of guide track extensions respectively aligned with said stationary guide tracks;
sequentially operated means for separating the end piece part in each guide track of each group from the piece part normally positioned immediately adjacent thereto;
reciprocally operated means for simultaneously driving the separated piece parts in each group initially along a short section of the respectively associated guide tracks to the terminating ends thereof, and then along the respectively aligned guide track extensions to a desired point whereat the piece parts from both groups are positioned in a desired array for subsequent pickup and transfer to an assembly station; and
reciprocally operated pick-up means for initially grasping and subsequnetly withdrawing the separated piece parts from said guide track extensions, and thereafter holding said piece parts in precise orientation and spaced relationship while transporting them to and inserting them in a mounting member at the assembly station.

7. Apparatus in accordance with claim 6, wherein said reciprocally operated pick-up means comprises a plurality of spring-biased fingers constructed to firmly grasp the separated piece parts on the guide track extensions respectively aligned therewith, and further comprising means for pivotally mounting and effecting the sequential pivoting of said pick-up means so as to permit the transfer of the piece parts held thereby to the assembly station.

8. Apparatus in accordance with claim 7, wherein said sequentially operated means for separating the end piece part in each guide track of each group comprises two reciprocally operated cross-slide mechanisms at least partially positioned beneath and respectively associated with each group, each cross-slide mechanism including a plurality of upwardly extending members each adapted to make contact with and separate the end piece part in a different guide track of the associated group from the piece part previously adjacent thereto while temporarily holding the latter piece part stationary.

9. Apparatus in accordance with claim 7, wherein said reciprocally operated means for simultaneously driving the separated piece parts to a desired point along the guide track extensions comprises two pneumatically driven, mutually opposed, and oppositely inclined pusher assemblies respectively associated with the two groups of guide tracks.

10. Apparatus for assembling piece parts comprising:
a plurality of stationary guide tracks extending toward each other from opposite directions to form two groups, with the common, mutually adjacent terminating guide track ends of the two groups being spaced apart a short distance;
means for feeding piece parts in piggy-back fashion along each of said guide tracks;
transfer station means interposed between said two groups of guide tracks, said transfer station means including a spring mounted platform and an associated stationary member which together form a plurality of guide track extensions respectively aligned with said stationary guide tracks;
sequentially operated piece part separator means respectively associated with the guide tracks in each of said groups for separating the end piece part in each associated guide track from the piece part normally positioned immediately adjacent thereto;
reciprocally operated means for simultaneously driving the separated piece parts in each group initially along a short section of the respectively associated guide tracks to the terminating ends thereof, and then along the respectively aligned guide track extensions to a desired point whereat the piece parts from both groups are positioned in a desired array for subsequent pickup and transfer to an assembly station, said last mentioned means comprising two reciprocally operated, mutually opposed, and oppositely inclined pusher assemblies respectively associated with the two groups of guide tracks and guided thereby; and
reciprocally operated pickup means comprising a plurality of spring-biased fingers constructed to firmly grasp the separated piece parts on the guide track extensions respectively aligned therewith, and further comprising means for pivotally mounting and effecting the sequential pivoting of said pickup means so as to permit the transfer of the piece parts held thereby to the assembly station.

11. Apparatus in accordance with claim 10 wherein said guide tracks on either side of said transfer station means are offset relative to each other so as to become interleaved by said guide track extensions.

12. Apparatus in accordance with claim 11 wherein said sequentially operated piece part separator means comprises two reciprocally operated cross-slide mechanisms partially positioned beneath and respectively associated with each group of guide tracks, each of said cross-slide mechanisms including a plurality of upwardly extending beveled members each adapted to make contact with and wedge the end piece part in a different guide track of the associated group away from the piece part previously adjacent thereto while temporarily holding the latter piece part stationary.

13. Apparatus for assembling piece parts comprising:
   a plurality of parallel guide tracks respectively extending from opposite directions toward but separated from each other by a common transfer area, said guide tracks on each side of said transfer area forming a group, with the guide tracks in the two groups being offset with respect to each other;
   means for feeding piece parts in piggy-back fashion along each of said guide tracks;
   a spring mounted platform and an associated stationary member which together form a plurality of guide track extensions respectively aligned with and interleaving the guide tracks in said two groups;
   two recipocally operated cross-slide mechanism partially positioned beneath and respectively associated with each group of guide tracks, each of said cross-slide mechanisms including an upwardly extending beveled member constructed to make contact with and thereafter wedge the end piece part in each guide track of the associated group away from the piece part previously adjacent thereto while holding the latter piece part stationary;
   reciprocally operated means for simultaneously driving the separated piece parts in each group initially along a short section of the respectively associated guide tracks to the terminating ends thereof, and then along the respectively aligned guide track extensions to a desired point whereat the piece parts from both groups are positioned in a desired array for subsequent pickup and transfer to an assembly station, said last mentioned means comprising two reciprocally operated, mutually opposed, and oppositely inclined pusher assembles respectively associated with the two groups of guide tracks and guided thereby; and
   reciprocally operated pickup means comprising a plurality of spring-biased fingers constructed to firmly grasp the separated piece parts on the guide track extensions respectively aligned therewith, and further comprising means for pivotally mounting and effecting the sequential pivoting of said pickup means so as to permit the transfer of the piece parts held thereby to the assembly station.

14. Apparatus in accordance with claim 13 further comprising a plurality of open grooves respectively extending in parallel, adjacent relationship with said plurality of guide tracks and aligned guide track extensions, and wherein each of said reciprocally operated pusher assemblies includes a plurality of pusher feet respectively positioned partially in and guided axially along said open grooves.

15. Apparatus in accordance with claim 14, wherein each of said two reciprocally operated pusher assemblies is pivotally mounted, and includes a pneumatically driven, sequentially operated, double-acting air cylinder to drive the separated piece parts contacted by the pusher feet of the associated assembly to the desired point on the respectively associated guide track extensions.

References Cited by the Examiner
UNITED STATES PATENTS

| | | | |
|---|---|---|---|
| 2,548,773 | 4/1951 | Chirelstein | 29—206 |
| 2,613,432 | 10/1952 | Gilbert | 29—206 X |
| 2,928,165 | 3/1960 | Carlzen et al. | 29—203 X |
| 2,970,371 | 2/1961 | Cardani et al. | 29—203 |

JOHN F. CAMPBELL, *Primary Examiner.*

THOMAS H. EAGER, *Examiner.*